Feb. 13, 1968 W. M. KAUFMAN ET AL 3,369,127

CRYOGENIC UNIVERSAL LOGIC ELEMENT

Filed May 26, 1964

WITNESSES:

Bernard R. Gieguer

James F. Young

INVENTORS
Terry A. Jeeves and
William M. Kaufman.
BY

United States Patent Office 3,369,127
Patented Feb. 13, 1968

3,369,127
CRYOGENIC UNIVERSAL LOGIC ELEMENT

William M. Kaufman, Westfield, N.J., and Terry A. Jeeves, Penn Hills Township, Pa., assignors to Westinghouse Electric Corporation, Pittsburgh, Pa., a corporation of Pennsylvania Filed May 26, 1964, Ser. No. 370,268
7 Claims. (Cl. 307—212)

The present invention relates to universal logic elements and more particularly to cryogenic universal logic elements utilizing superconductive switching devices.

Certain metals upon being supercooled to temperatures approaching absolute zero display the characteristic of having substantially no resistance. The superconductive characteristic however is lost if the metal is brought to a temperature somewhat higher than absolute zero. It has also been found that the superconductive metal will return to its resistive state if a magnetic field of sufficient strength is applied to the metal. A superconductive switching element, commonly called a cryotron, thus can be provided by utilizing a magnetic field to switch on and off the current flow through the metal by changing it from its superconductive to resistive state.

Until recently a serious drawback in the use of cryotrons in computer application has been their slow switching speeds. However, newly developed thin film techniques have reduced the switching speeds of a single cryotron element to only a few millimicro seconds. With speeds now compatible with computer applications, cryotrons may be seriously considered for computer components. Upon further consideration, design problems have been encountered increasing the cost of cryotron logic devices. Cryotrons are current switching devices. Therefore, an alternate current path must always be provided for the source current whenever a current path is switched open.

The current switching is caused by one or more of the cryotrons in that path being switched from a superconductive, no resistance state to a normal resistive state. The switching is usually accomplished by the application of a magnetic field. The requirement for an alternate current path is somewhat unusual in switching circuit technology. There is no such requirement in relay circuits, which are current activated devices; nor in typical vacuum tube or transistor switching circuits, which are normally voltage sensitive devices. Because of the lack of need in prior technology, there is very little design experience available for the design of circuits requiring the switching of current along alternate current paths. This results in most circuits using cryotrons showing a high degree of ingenuity on the part of the designer, but at the cost of a very low degree of systemized design procedure and a high cost of logic components.

It is therefore an object of the present invention to provide a new and improved cryogenic universal logic element.

It is a further object of the present invention to provide a cryogenic universal logic element wherein a systemized design procedure may be utilized and requiring a minimum number of cryotron logic devices.

It is a still further object of the present invention to provide a new and improved cryogenic universal logic element which may readily be fabricated using thin film technniques and the interrelationship of large numbers of such elements.

Broadly, the present invention provides a cryogenic universal logic element in which cryotron devices are arranged to be energized by a current source and controlled by input signals and their complements so that when a device is switched to its resistive state an alternate current path is always provided through at least one of the devices. Predetermined logic functions and the complements of these functions are provided at respective outputs of the element.

These and other objects and advantages of the present invention will become more apparent when considered in view of the following specification and drawings, in which.

Figure 1:
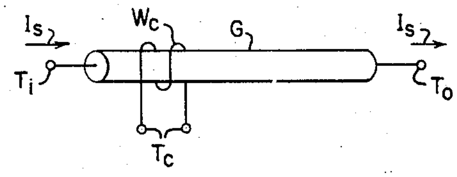
FIGURE 1 is a schematic diagram of a cryotron logic device.

Referring to FIG. 1, a cryotron superconductive switching device is shown having a gate G comprising a superconductive material, for example, tantalum. On each end of the gate G is connected a current terminal $T_i$ and $T_o$, respectively. A source of current, not shown, is connected to the input current terminal $T_i$, with current passing through the gate G substantially undiminished when the superconductive material is in its superconductive state, to the output current terminal $T_o$. Disposed about the gate G is a control winding $W_c$ having an input terminal pair $T_c$. The control winding $W_c$ also comprises a superconductive material, for example, niobium. In the absence of an input signal (a binary ZERO signal) being applied to the terminal pair $T_c$, current $I_s$ will flow substantially undiminished from the input terminal $T_i$ through the superconductive gate G to the output terminal $T_o$. However, if an input signal (a binary ONE signal) is applied to the terminal pair $T_c$, a magnetic field will be created in the gate G which will switch the gate G from its superconductive state to its resistive state and thereby impeding the passage of current $I_s$ between the terminals $T_i$ and $T_o$. The input signal applied to the control winding $W_c$ through the input pair $T_c$ will in computer application be in binary form, with a ONE binary state indicating the presence of an input signal and a ZERO binary state indicating the absence of an input signal.

For best operation of the cryotron, the superconductive material of the gate G should be of a low critical temperature superconductive material which possesses the characteristic of switching to its resistive state upon the application of a relatively small magnetic field. Tantalum is an example of a material having such a characteristic. The material of the control winding $W_c$ should be of a high critical temperature superconductive material so that it requires a substantially greater magnetic field to change the element from its superconductive to its resistive state. Niobium is an example of a material having a high critical temperature characteristic. The cryotron device shown in FIG. 1 thus provides a current switching logic device which performs a switching operation in response to input binary signals to its control winding $W_c$ to switch on and off current between its current terminals $T_i$ and $T_o$.

Figure 2:
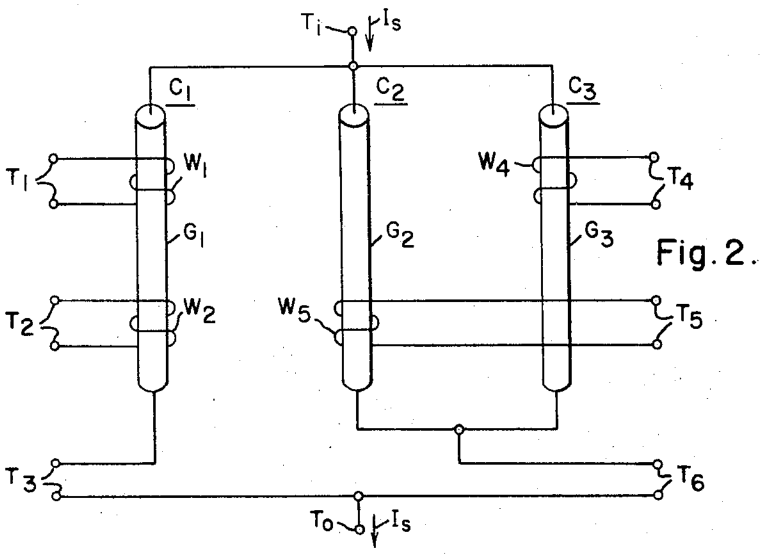
FIG. 2 is a schematic diagram of a cryogenic universal logic element.

FIG. 2 shows the cryogenic universal logic element of the present invention. Sometimes herein this element will be called a CULE, after the first letter of each term of its name. The CULE of FIG. 2 comprises only three cryotron devices $C_1$, $C_2$ and $C_3$. The gates $G_1$, $G_2$ and $G_3$ of each of the cryotrons are connected commonly at one end to the terminal $T_i$ to receive input current $I_s$ from a current source. The cryotron $C_1$ has a control winding $W_1$ disposed on the gate $G_1$ with a pair of input terminals $T_1$ and also an input winding $W_2$ with a pair of input terminals $T_2$. The cryotron $C_3$ has a control winding $W_4$ disposed on the gate $G_3$ with an input terminal pair $T_4$. The cryotron $C_2$ has a control winding $W_5$ disposed about the gate $G_2$ and has a pair of input terminals $T_5$. The other end of the gate $G_1$ of the cryotron $C_1$ is connected in series with a pair of output terminals $T_3$. The bottom one of the output terminal pair $T_3$ is connected by a lead to the output current terminal $T_o$, from which the current $I_s$ may be taken. The other ends of the gates $G_2$ and $G_3$ are commonly connected so that the cryotrons $C_2$ and $C_3$ are connected in parallel by their current terminals. A pair of output terminals $T_6$ is connected in series with the commonly connected ends of the gates $G_2$ and $G_3$ opposite the current input of the elements $C_2$ and $C_3$. The bottom terminal of the output terminal pair $T_6$ is connected to the output current terminal $T_o$ along with the bottom terminal of the output terminal pair $T_3$.

The cryotrons as used in the CULE of FIG. 2 may comprise the same materials as that of the cryotron of FIG. 1, with the gate comprising a low critical temperature superconductive material and the control windings comprising a high critical temperature superconductive material. Also, the interconnecting leads between the terminals $T_i$ and $T_o$ to the various gates may comprise a high critical temperature material the same as that of the control windings.

Binary input signals A, B and their complementary signals $\bar{A}$ and $\bar{B}$ are selectively applied to the signal input terminals $T_1$, $T_2$, $T_4$ and $T_5$. Output signals C and its complementary signal $\bar{C}$ are taken from the output terminals $T_3$ and $T_6$, respectively. The output signals, as will be demonstrated, are predetermined logical functions of the input signals to the CULE unit. It should be noted that when four binary signals, two input signals and their complementary signals, are applied to the four control windings, at all times at least one of the cryotrons will be in its superconductive state to provide a current path for the current $I_s$, while either one or both of the other cryotrons may be switched to its resistive state by the application of a ONE binary signal to a control winding associated therewith. Moreover, the output logical function C of the input signals is provided as well as is the complementary output signal $\bar{C}$ as the other output of the CULE unit.

That the CULE unit of FIG. 2 performs universal logic functions may be seen from the following analysis. If for instance the NOR logic function is desired as the incremental logic function of the unit the Boolean expression $\bar{A}+\bar{B}$ must be satisfied. Or saying this in words: for an output ONE signal to be provided by a NOR logic element no input signal must be applied to a first input of the element, nor a second input, nor any input.

In the CULE unit of FIG. 2, to perform the NOR logic function, the input signals A and B are applied, respectively, to the terminal pairs $T_1$ and $T_2$ of the control windings $W_1$ and $W_2$ of the cryotron $C_1$. The complementary signals $\bar{A}$ and $\bar{B}$ of the input signals A and B are applied, respectively, to the terminal pairs $T_4$ and $T_5$ of the control windings $W_4$ and $W_5$ of the cryotrons $C_3$ and $C_2$. It is assumed that the presence of current $I_s$ flowing between the output terminal pairs $T_3$ or $T_6$ is to be a ONE binary signal, and the absence of current flow through the output terminal pairs $T_3$ and $T_6$ is to be a ZERO signal. The NOR logic function is performed, with the logical output Y appearing at the terminal $T_3$ and the complement $\bar{Y}$ appearing at the terminal $T_6$. This can be seen in that if both the input signals A and B are at a ZERO binary state, a ONE signal will appear at the output terminal $T_3$ satisfying the NOR function. No output signal (a ZERO) will appear at the terminal $T_6$, since both the complementary input signals $\bar{A}$ and $\bar{B}$ will have a ONE value and thus $\bar{Y}$ will be at a zero value across the output terminals $T_6$. If, however, either A or B or both A and B are at a ONE binary value, the output at $T_3$ for the output signal Y will be obtained by the switching of the cryotron $C_1$ to its resistive state to provide a ZERO value at the output terminal pair $T_3$. With either A or B or both A and B being at a ONE value, one of the complementary signals $\bar{A}$ or $\bar{B}$ or both $\bar{A}$ and $\bar{B}$ will be at a ZERO binary value to provide a conductive path therethrough to cause the complementary signal $\bar{Y}$ to be at a ONE binary state and thereby satisfy the NOR logic function.

The following chart perhaps better shows the various logic functions that may be performed by the CULE unit. The chart shows the logic function and the input signals required at terminals $T_1$, $T_2$, $T_4$ and $T_5$, as well as where the output signal may be obtained.

| Binary Logic Function | Required Inputs at CULE Terminal Pairs 1 | 2 | 4 | 5 | Output Terminal From which desired function can be obtained |
|---|---|---|---|---|---|
| (OR) A+B | A | B | $\bar{A}$ | $\bar{B}$ | $T_6$ |
| (AND) A·B | $\bar{A}$ | $\bar{B}$ | A | B | $T_3$ |
| (NOR) $\overline{A+B}$ | A | B | $\bar{A}$ | $\bar{B}$ | $T_3$ |
| (STROKE) $\overline{A \cdot B}$ | $\bar{A}$ | $\bar{B}$ | A | B | $T_6$ |
| $\bar{A}$+B | $\bar{A}$ | B | A | $\bar{\bar{B}}$ | $T_3$ |
| A+$\bar{B}$ | A | $\bar{B}$ | $\bar{A}$ | B | $T_3$ |
| $\bar{A}$·B | A | $\bar{B}$ | $\bar{A}$ | B | $T_6$ |
| A·$\bar{B}$ | $\bar{\bar{A}}$ | B | A | $\bar{B}$ | $T_6$ |

It should also be known that various other logic functions may be fabricated by the simple combination of CULE units. Moreover, starting with the CULE as a building block, a systemized design procedure may be incorporated to fabricate a computer system utilizing only the universal CULE element of FIG. 2.

Figure 3:
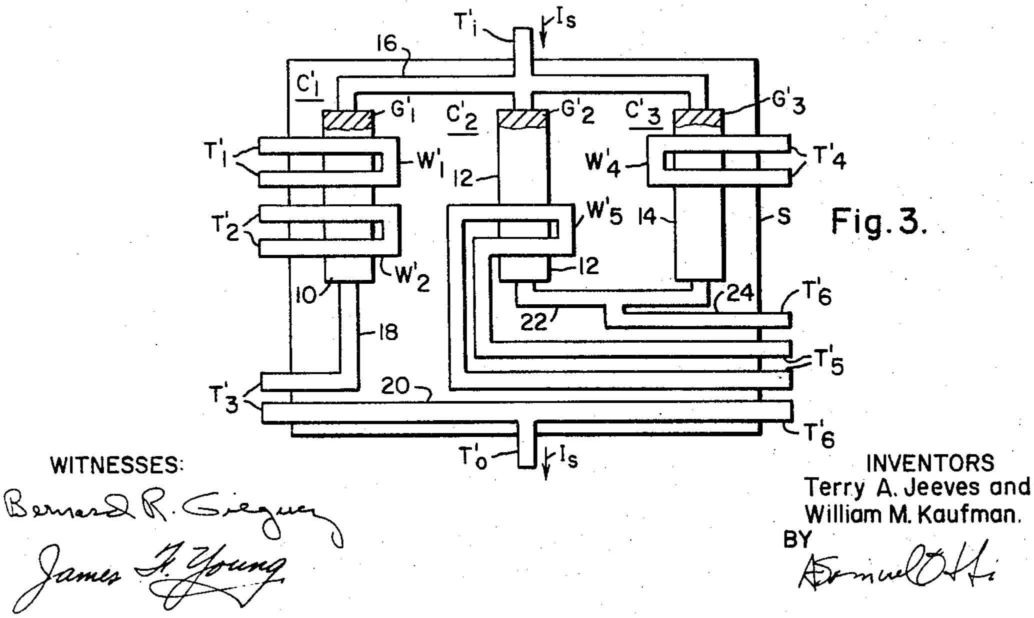
FIG. 3 is a schematic diagram of a cryogenic universal logic element fabricated by a thin film technique.

FIG. 3 shows a cryogenic universal control element fabricated using thin film techniques. It has been found that a cryotron device may be fabricated by using a thin film of superconductive material as the gate of the device. A thin film of insulating material is then disposed over the gate film, and a control film of superconductive material disposed over the insulating strip. It has been found that by merely crossing the gate strip a sufficient magnetic field may be induced by the control strip to effect switching or bistable operation from a superconductive to a resistive state in the gate strip.

In FIG. 3, similar reference figures with a prime (′) indicate similar functions performed by the element of FIG. 3 as compared to FIGS. 1 and 2. A substrate member S provides the base member for the element and may comprise glass, for example. Disposed on the substrate S are three cryotron S′C′$_1$, C′$_2$ and C′$_3$ including respectively gate strips G′$_1$, G′$_2$ and G′$_3$ comprising a superconductive material having a low critical temperature characteristic, such as tantalum. Over the gate strips G′$_1$, G′$_2$ and G′$_3$ is placed a thin film of insulating material 10, 12 and 14 and may, for instance, comprise silicon monoxide. Disposed over the gate strip G′$_1$ and the insulating film $P_1$ are U-shaped control windings W′$_1$ and W′$_2$, which have respectively the inputs T′$_1$ and T′$_2$. The inputs T′$_1$ and T′$_2$ serve to apply binary input signals to the logic element. Over the gate strip G′$_3$ and the insulating film 14 is disposed a control strip $W_4$ in a U-shape to provide input signals to the cryotron strip C′$_3$. The input T′$_4$ supplies an input connection to the strip W′$_4$. A control strip W′$_5$ is associated with the cryotron strip C′$_2$ and is disposed over the gate strip G′$_2$ and the film 12 of insulating material. The strip W′$_5$ is U-shaped over the gate strip G′$_2$ and then extends in an L-shape to have an input T′$_5$ at the right bottom of FIG. 2. An input current strip 16 connects the gate strips G′$_1$, G′$_2$ and G′$_3$ to the input T′$_1$ so that current $I_s$ may be applied to each of the cryotron devices C′$_1$, C′$_2$ and C′$_3$. An output current strip 18 connects the bottom of the strip G′$_1$ to the input pair T′$_3$. The bottom end of the input pair T′$_3$ is connected to an output current strip 20 which extends longitudinally along the substrate S. An output T′$_o$ is connected to the strip 20 from which the current $I_s$ may be taken. A conducting strip 22 connects the bottom ends of the gate strips G′$_2$ and G′$_3$ so that they are connected in parallel. The conducting strip 22 is connected by a conducting strip 24 to an input pair T′$_6$. The bottom of the input pair $T'_6$ is connected to the output current strip 20 and in turn to the current output $T'_o$.

The material of the gates $G'_1$, $G'_2$ and $G'_3$ may comprise a high critical temperature material such as tantalum. The material for the control strips $W'_1$, $W'_2$, $W'_4$ and $W'_5$ may comprise a high critical temperature superconductive material such as niobium. Also the conducting strips 16, 18, 20, 22 and 24 may comprise a high critical temperature material.

The thin film fabricated element of FIG. 3 functions the same as the CULE of FIG. 2. Input signals and their complements are applied to the input pairs $T'_1$, $T'_2$, $T'_4$ and $T'_5$, while the logical output functions of these inputs are taken from the output pairs $T'_3$ and $T'_6$.

The logical functions as shown in the above chart can all be provided by the fabricated CULE of FIG. 3. Through the use of such a fabricating technique, a large number of elements may be produced economically along with having the advantage of being able to use a systemized design procedure because of the universal nature of the element being fabricated.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

We claim as our invention:

1. A cryogenic universal logic element operative with input signals and energized by a current source including, a first cryotron logic device including a plurality of control windings associated therewith to receive input signals, a second and a third cryotron logic device operatively connected in parallel, each of said pair of devices having a control winding disposed thereon, each of said devices being operative to pass current therethrough from the current source if a first type of input signal is applied to any of its associated control windings and to block passage of current therethrough if a second type of input signal is applied to any of its associated control windings, first output terminals operatively connected to said first device to provide first output signals indicative of predetermined logic functions of the input signals, and second output terminals operatively connected to said second and third devices to provide second output signals indicative of a predetermined logic function of the input signals.

2. A cryogenic universal logic element operative with input signals and energized by a current source including, a first cryotron logic device including a plurality of control windings disposed thereon to receive input signals, a second and third cryotron logic device operatively connected in parallel, each of said pair of devices including a control winding disposed thereon, each of said cryotron logic devices including a pair of current terminals and being operative to pass current from one current terminal to the other through said device from the current source if a Zero input signal is applied to any of its associated control windings and to block passage of current therethrough if a ONE input signal is applied to any of its associated control windings, first output terminals operatively connected to one current terminal of said first device to provide first output signals indicative of predetermined logic functions of the input signals, and second output terminals operatively connected to one of said current terminals of said second and third devices to provide second output signals indicative of a predetermined logic function of the input signals.

3. A cryogenic universal logic element operative with input signals and energized by a current source including, a plurality of cryotron logic devices each including a pair of current terminals to receive current from the current source and at least one control winding associated therewith, each of said devices being operative to pass current therethrough from the current source if a first type of input signal is applied to any of its associated control windings and to block passage of current therethrough if a second type of input signal is applied to any of its associated control windings, a first device of said plurality of devices including a plurality of control windings to receive input signals, first output terminals connected to said first device to provide first output signals in response to current flow through said first device indicative of predetermined logic functions of the input signals, and a pair of said devices with their current terminals commonly connected, each of said pair of devices including a control winding disposed thereon, and second output terminals operatively connected to said pair of devices to provide second output signals in response to current flow in said pair of devices indicative of a predetermined logic function of the input signals.

4. A cryogenic universal logic element operative with input signals and energized by a current source including, at least three cryotron logic devices each having a pair of current terminals disposed at the opposite ends thereof and each having at least one control winding, each of said devices being operative to pass current therethrough from the current source in the absence of an input signal being applied to any of its associated control windings and to block passage of current therethrough if an input signal is applied to any of its associated control windings, a first device of said devices having a plurality of control windings to receive input signals disposed thereon and having one current terminal connected to the source, first output terminals connected to the other current terminal opposite the current source of said first device to provide first output signals indicative of predetermined logic functions of the input signals, and a pair of said devices being connected in parallel with their current terminals commonly connected, each of said pair of devices having a control winding disposed thereon and having one current terminal operatively connected to the current source, and second output terminals connected to the other current terminal opposite the current source of said pair of devices to provide second output signals indicative of a predetermined logic function of the input signals.

5. A cryogenic universal logic element operative with input signals and energized by a current source including, three cryotron logic devices each comprising a low temperature superconductive material and including a pair of current terminals disposed at the opposite ends thereof and each having at least one control winding, said control winding comprising a high critical temperature superconductive material, each of said devices being operative to pass current therethrough from the current source if a ZERO state input signal is applied to any of its associated control windings and to block passage of current therethrough if a ONE state input signal is applied to any of its associated control windings, a first device of said devices having at least two control windings to receive input signals disposed thereon and having one current terminal connected to the source, first output terminals connected to the other current terminal opposite the current source of said first device to provide first output signals indicative of predetermined logic functions of the input signals, a second and third of said devices being connected in parallel with their current terminals commonly connected, each of said second and third devices having a control winding disposed thereon and having one current terminal operatively connected to the current source, and second output terminals connected to the other current terminal opposite the current source of said pair of devices to provide second output signals indicative of a predetermined logic function of the input signals, the first and second output signals being the logical complements of each other.

6. A cryogenic universal logic element operative with a binary input signal and energized by a current source comprising, a plurality of logic strips, each strip comprising a first superconductive material, at least one control strip disposed over each of said logic strips to receive input signals, said control strips comprising a second superconductive material, a conducting strip to connect one end of said logic strip to the current source, each of said bistable strips being operative to pass current therethrough if a first type of input signal is applied to any of its control strips and to block passage of current if a second type of input signal is applied to any of its control strips, a first of said logic strips having at least two control strips disposed thereon to receive input signals, a pair of said logic strips each having at least one control strip to receive input signals, a first output strip connected to said logic strips at the end opposite the current source to provide first output signals indicative of predetermined logic functions of the input signals, a second output strip connected to the pair of logic strips at the end opposite the current source to provide second output signals indicative of predetermined logic functions.

7. A cryogenic universal logic element operative with binary input signals and energized by a current source comprising, three logic strips, each strip including a bistable gate film comprising a low critical temperature superconductive material and an insulating film disposed on said bistable gate film, at least one control strip disposed over each of said logic strips to receive input signals, said control strips comprising a high critical temperature superconductive material, a conducting strip to connect one end of the bistable gate films of said logic strips to the current source, each of said bistable strips being operative to pass current therethrough if a ZERO state input signal is applied to any of its control strips and to block passage of current if a ONE state input signal is applied to any of its control strips, a first of said logic strips including two control strips disposed thereon to receive input signals, a pair of said logic strips each having at least one control strip to receive input signals, a first output strip connected to the bistable film of the first of said logic strips at the end opposite the current source to provide first output signals indicative of predetermined logic functions of the input signals, and a second output strip connecting the bistable film at the pair of logic strips at the end opposite the current source to provide second output signals indicative of predetermined logic functions.

No references cited.

ARTHUR GAUSS, *Primary Examiner.*

D. D. FORRER, *Assistant Examiner.*